UNITED STATES PATENT OFFICE.

ROBERT M. THOMPSON, OF NEW YORK, N. Y., ASSIGNOR TO THE ORFORD COPPER COMPANY, OF NEW JERSEY.

PROCESS OF OBTAINING AND SEPARATING SULPHIDE OF NICKEL.

SPECIFICATION forming part of Letters Patent No. 489,881, dated January 10, 1893.

Application filed March 14, 1892. Serial No. 424,866. (No specimens.)

*To all whom it may concern:*

Be it known that I, ROBERT M. THOMPSON, a citizen of the United States, and a resident of the city, county, and State of New York, have invented certain new and useful Improvements in Processes of Obtaining and Separating Sulphide of Nickel and other Products of Nickel in the Treatment of Ores and Mattes Containing Nickel, of which the following is a specification.

My invention relates to an improvement in the method or process of obtaining and separating commercially pure sulphide of nickel for use in metallurgical operations, in the treatment of mattes of copper, nickel, iron, and other metals, as the same result from the various operations of ore smelting, and more particularly to a method or process in which the separation is effected by the addition of certain chemical re-agents, which not alone change the chemical composition of the smelted mass, but also tend to produce, after smelting great fluidity in the mass, whereby the various metals or salts of metal contained therein assume upon cooling, by reason of their varying specific gravity, such relative positions with reference to each other, that they may be readily separated by mechanical means, or by hand. Now I have discovered that when nickel is combined with other metals, as for instance iron and copper, or either of them, in an ordinary matte, produced from or by the primary treatment of the ores of these metals, in the ordinary operation of smelting in any convenient form of furnace they exist probably as a combined molecule, and the affinity of the various metals for the sulphur is different, and when the mattes or other substances containing nickel are treated with a certain class of alkalies or alkaline salts, rich in oxygen, such as carbonates of the various alkalies or caustic alkaline metals or ammonium, such as potash or soda or either of them, or any of them mixed together, the combined molecule is split up, and the nickel is desulphurized and changed either into a crude metallic form, or into a sulphide differing in chemical composition, from that in which it existed in the matte or ore, and containing more or less sulphur, according to conditions, and the product of the smelting operation, so far as it consists of this crude nickel or nickel sulphide, will be of greater specific gravity than the other metals and may be readily separated therefrom. When any of the substances above mentioned are added to a charge of matte, in a cupola, or blast furnace, in suitable quantities, the caustic alkali or carbonate, tends to absorb a portion of the sulphur from the matte, and to form a sulphide of the particular alkaline metal or base, which is employed. In so doing it breaks up the combined molecule in which the metals exist, and takes from part of the metals the greater part of the sulphur combined in them. As under these conditions the sulphur has a less affinity for the nickel than for the other metals, a proportionately larger amount of nickel, than of the other metals is reduced to a metallic state, and when the smelted mass is tapped after smelting from the furnace, and allowed to cool in an ordinary cooling bed, or in any mold or slag pot, two distinct compounds will be found to have been produced, which will assume with reference to each other the relative position of layers or strata, and which are called "tops" and "bottoms" according to their position. The "tops" so called consist of sulphide of the alkaline metal or ammonium, sulphide of copper and some sulphide of iron and nickel, while the "bottoms" consist of a small amount of alkali and copper, iron and nickel in crude metallic state and perhaps a little sulphide of these metals, the proportion of the nickel being largely in excess of the proportion of the iron and copper.

The separation of the "tops" from the "bottoms" may be effected if desired while they are still liquid, by allowing the mass to settle, and then siphoning or pouring off the former in any convenient manner, for the reason that in practice the "bottoms" solidify rapidly while the "tops" remain liquid. If now the so-called "bottoms" resultant from this operation or step in the separation are subjected to further treatment by again smelting or melting in any shaft or other suitable furnace, with any sulphide of any alkaline metal or ammonium such as sulphide of soda, containing preferably an excess of free sulphuric acid, the metals by re-absorbing sulphur from the sulphide of any alkaline metal or ammonium will be reconverted into sulphides and the alkali converted into caustic alkali. The tendency of the sulphides thus formed is not to form a compound molecule such as existed in the original ore or matte, but separate molecules of sulphides of the various metals present. The copper and iron associated with the metallic nickel in the "bottoms" resultant from the first treatment with caustic alkalies or carbonates of the alkaline metal or ammonium exist either as a different sulphide from that in which it existed before or in a lower sulphide, and when any sulphide of any alkaline metal or ammonium such as sulphide of soda is added, first the copper, then the iron and finally the nickel take up sulphur from it, and the lower sulphides existing in the bottoms with the crude nickel are converted into full sulphides. These higher sulphides coalesce with the soda and form a mass which is very light. The lower sulphides of the metal do not so coalesce and are preccipitated to the bottom and by repeating the operation all the lower sulphides of iron and copper are converted into higher sulphides and are thus separated from the lower sulphide of nickel. If now the nickel sulphide settling in the bottom be separated by mechanical means, or by hand and subjected to repeated treatment by smelting with sulphide of soda, any number of times, the iron and copper may be still further separated, and eventually a sulphide of nickel produced, which is commercially pure.

The smelting operation may be carried out in any convenient form of furnace and the separation effected as above indicated either by siphoning off after settling before cooling, or by mechanical separation after the smelted mass has become hard. The sulphide of nickel thus separated may be subjected to further metallurgical treatment, and be reduced to metallic nickel and sold as such or it may be converted into oxide of nickel and sold, or sold directly as sulphide, according to the purpose for which the nickel is required.

I claim as my invention:

1. The hereinbefore described method of producing and separating nickel sulphide, consisting in smelting the ores or mattes containing nickel with caustic alkalies carbonates of the alkaline metal or ammonium, or other similar reagents rich in oxygen, substantially as set forth, whereby the nickel is converted into crude metallic nickel, in allowing the crude nickel to settle and separate by gravity in separating the crude nickel after settling, and in resmelting the same with a sulphide of any alkaline metal substantially as set forth, whereby nickel sulphide and caustic alkali are produced, and in allowing the nickel sulphide to settle and separate by gravity and separating the same after settling.

2. The hereinbefore described method of producing and separating nickel sulphide, consisting in smelting the ores or mattes containing nickel with caustic alkalies carbonates of the alkaline metal or ammonium, or other similar reagents rich in oxygen, substantially as described, whereby the nickel is converted into crude metallic nickel, in allowing the crude nickel to settle and separate by gravity, in separating the crude nickel after settling and in resmelting the same, with a sulphide of any alkaline metal, whereby nickel sulphide and caustic alkali are produced, in allowing the nickel sulphide to settle and separate by gravity, in separating the same after settling and subjecting it to repeated smelting with a sulphide of any of the alkaline metals and separation by gravity until the impurities are eliminated and a residue of commercially pure sulphide of nickel is produced.

3. The method of producing sulphide of nickel from "bottoms" resulting from the initial treatment of nickel ores or mattes, with alkaline reagents, substantially in the manner described; consisting in smelting the same with a sulphide of any alkaline metal, substantially as described, whereby nickel sulphide and caustic alkali are formed, and in allowing the former to settle and separate by gravity and removing the same after settling.

In testimony that I claim the foregoing as my invention I have signed my name, in presence of two witnesses, this 12th day of March, 1892.

ROBERT M. THOMPSON.

Witnesses:
C. VAN BRUNT,
CHAS. C. CORNWELL.